May 3, 1960 H. KABELITZ 2,935,311
METHOD AND APPARATUS FOR COMPARING MEASURING
AND REGULATING SPEED DIFFERENCES
Filed Jan. 13, 1954 4 Sheets-Sheet 1
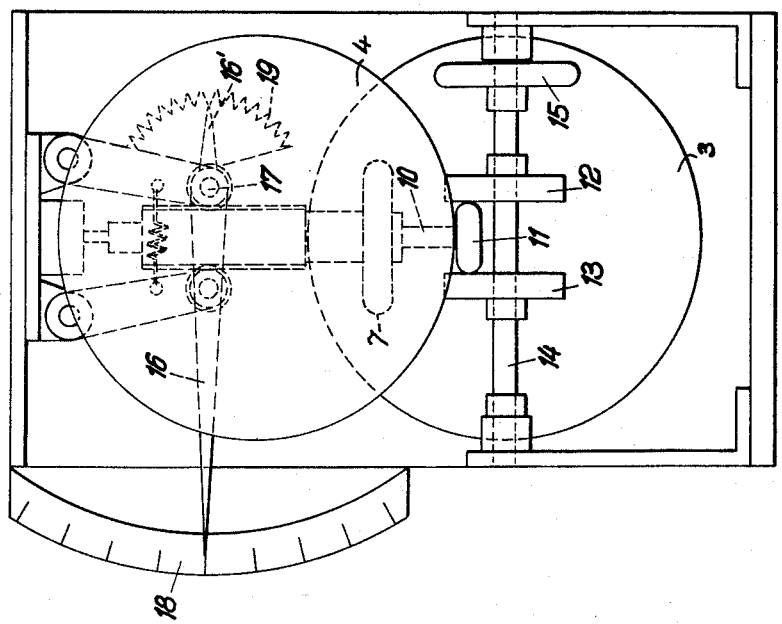
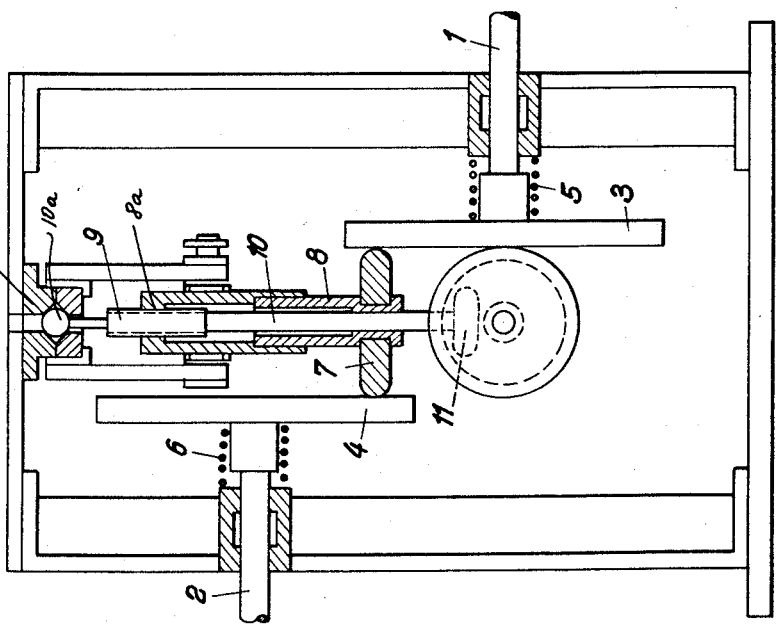
Inventor:
HANS KABELITZ
BY:

May 3, 1960 H. KABELITZ 2,935,311
METHOD AND APPARATUS FOR COMPARING MEASURING
AND REGULATING SPEED DIFFERENCES
Filed Jan. 13, 1954 4 Sheets-Sheet 2
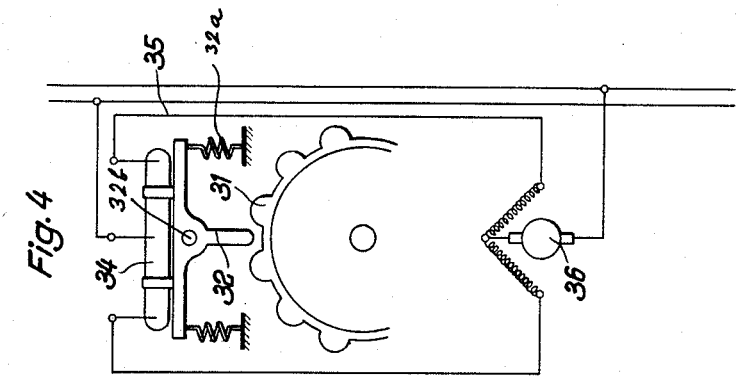
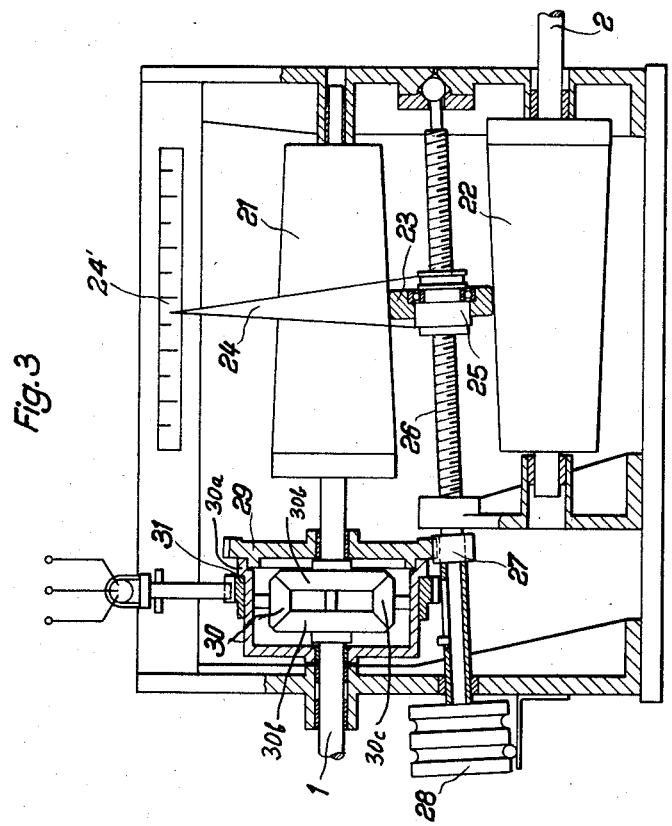
Inventor:
HANS KABELITZ
BY:

May 3, 1960

H. KABELITZ 2,935,311

METHOD AND APPARATUS FOR COMPARING MEASURING
AND REGULATING SPEED DIFFERENCES

Filed Jan. 13, 1954

Inventor:
HANS KABELITZ
BY:

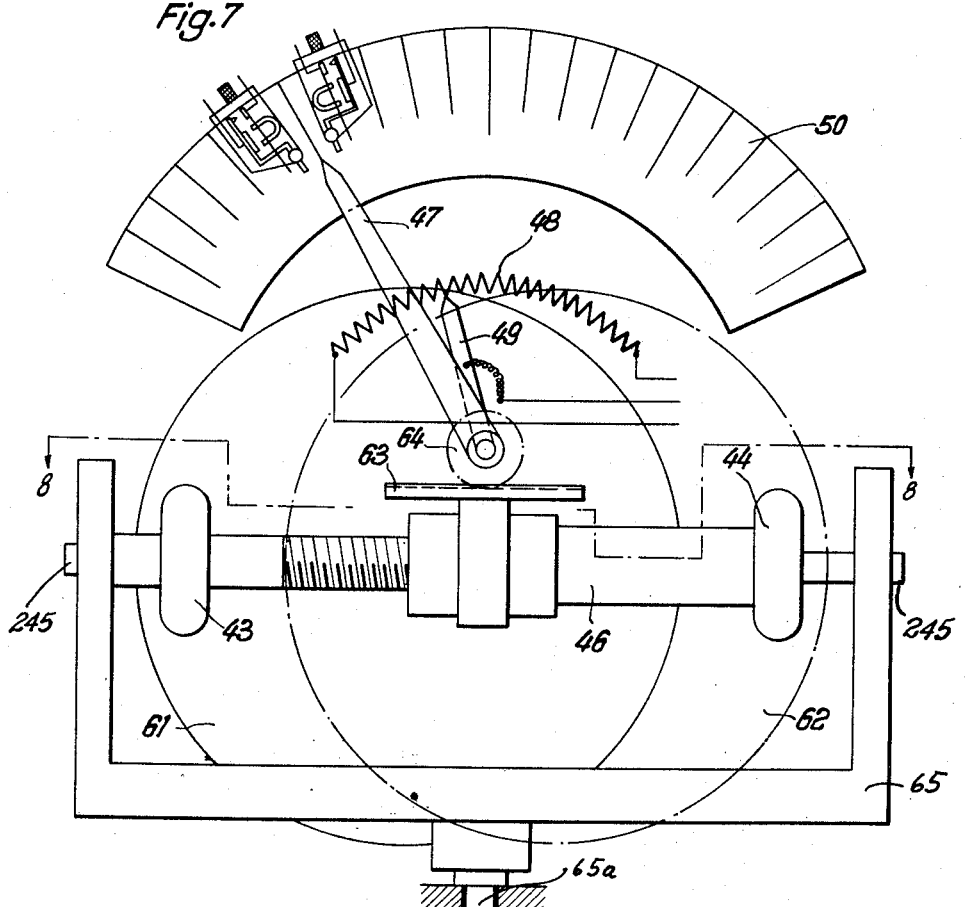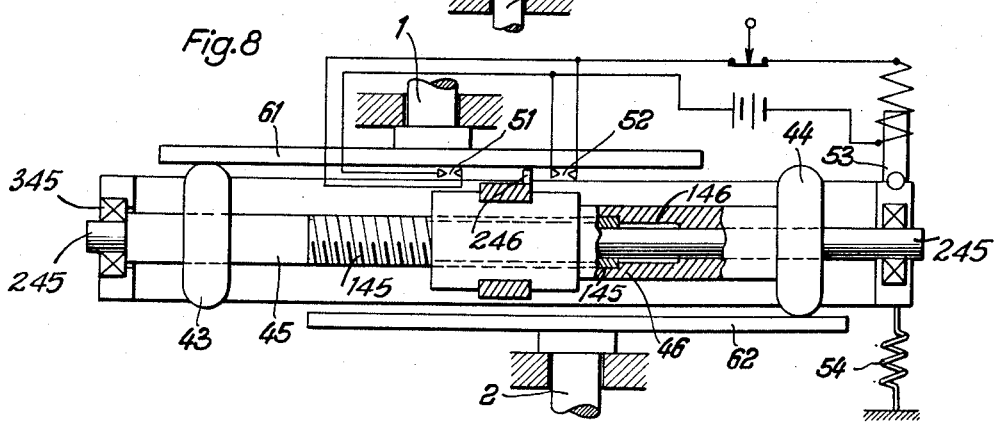

United States Patent Office 2,935,311
Patented May 3, 1960

2,935,311

METHOD AND APPARATUS FOR COMPARING MEASURING AND REGULATING SPEED DIFFERENCES

Hans Kabelitz, M. Gladbach, Germany, assignor to Firma Gebrüder Sucker, G.m.b.H., M. Gladbach, Germany Application January 13, 1954, Serial No. 403,837

Claims priority, application Germany January 17, 1953

6 Claims. (Cl. 317—6)

The present invention refers to a method and apparatus for comparing and regulating the speeds of two elements.

According to the present invention, a measuring means is provided for ascertaining deviations from the desired ratio between the speeds of two elements rotating at different speeds, whereupon a regulating means is caused to perform a regulating operation. During the regulation, the regulating means are driven from at least one of the rotary elements whose speeds are compared. The movement of the regulating means for obtaining the desired speed ratio may also be used for adjusting the actual ratio. It is advantageous to construction both above mentioned means as friction means. However, the desired results can also be obtained by a variable friction transmission and a differential gear means. The two sun gears of the differential gear means, or one sun gear and the spider carrying the planet gears, may be driven at the rotary speeds which are to be compared, while the third motion of the spider, or of the second sun wheel, respectively, which occur during speed differences, produce the movement which acts on a variable transmission for changing the ratio thereof and for carrying out the regulating operations required for obtaining the desired conditions.

If friction transmissions are used, two transmissions are preferably coaxially arranged. The shaft of one friction disc, preferably the friction disc of the regulating means, is located in a hollow shaft carrying the friction disc of the measuring means.

A change of the position of the hollow shaft also changes the transmission ratio of a variable friction transmission to the actual value which is indicated by indicating means connected to the hollow shaft. It is also contemplated to transfer an indication of the position of the hollow shaft to a remote point so that the indication as well as the regulation may take place from a receiver actuated by a transmitter.

In the embodiment of the present invention employing differential gear means, it is advantageous to secure to the spider of the differential gear means a cam wheel which actuates an electric circuit according to deviations from the normal speed ratio in one or the other direction. The cam wheel actuates a switch to move between two control positions in which a motor is actuated to regulate the increased or decreased speed in opposite directions until a desired value is obtained.

According to another embodiment of the present invention each of the rotary elements drives a rotary member by friction means, and the shafts supporting the two rotary members are in threaded engagement so that the distance between the rotary members varies in accordance with their speed differences. The variation of the difference is then used for measuring, indicating and regulating. In this embodiment as well, the indication may be remote, and potential meter or measuring resistances may be used, while a receiver carries out the regulation.

The apparatus according to the present invention is particularly suited for measuring and regulating the stretching and/or shrinking of textile on textile machines. The apparatus according to the present invention not only permits a control of such conditions but also causes regulating to the desired condition when required.

It is the main object of the present invention to overcome the disadvantages of the known devices for indicating shrinking or stretching of textiles, and to provide an apparatus for indicating speed differences between two rotary elements which are indication of an undesirable condition in textiles.

It is another object of the present invention to provide an apparatus including means for measuring changes in the speed ratio between two rotary elements and other means actuated by the measuring means for effecting regulation.

With these objects in view the present invention mainly consists in an apparatus for comparing speeds, which comprises in combination two rotary elements, at least one of the rotary elements rotating at a varying speed, variable transmission means connected for rotation to the one of the rotary elements and including a first rotary member, a second rotary member connected to the other of the rotary elements for rotation therewith, movable control means connected to the first and second rotary members and being moved by the same to an actuating control position when the rotary members rotate at different speeds due to a speed difference between the rotary elements, the movable control means being connected to the variable transmission means and adjusting the transmission means in the control position until the speeds of the first and second rotary members are equal, indicating means connected for movement to the movable control means for indicating the extent of adjustment of the variable transmission means and thereby the ratio of the speeds of the rotary elements, and operating means connected to the control means for regulating the conditions causing different speeds of the rotary elements until the same rotate again at the same speed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a sectional view of an embodiment of the present invention;

Fig. 2 is a side view of the embodiment shown in Fig. 1;

Fig. 3 is a sectional view of another embodiment of the present invention;

Fig. 4 is a fragmentary schematic side view of the embodiment shown in Fig. 3;

Fig. 7 is a front view of a further embodiment of the present invention; and

Fig. 8 is a sectional view of the embodiment shown in Fig. 7 taken on line 8—8.

Figure 5:
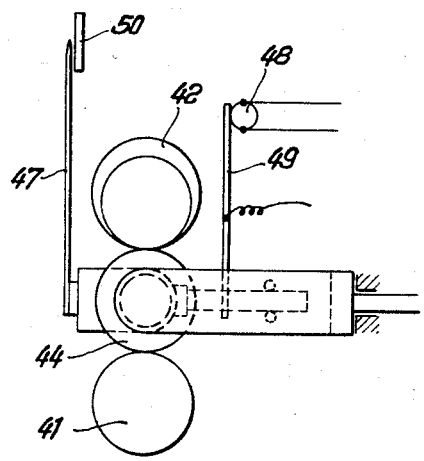
Fig. 5 is a fragmentary schematic side view of another embodiment of the present invention.

Referring now to the drawing and more particularly to Figs. 1 and 2, the rotary elements 1 and 2 are connected to rotating members whose rotary speeds are to be compared. The rotary elements 1, 2 carry the large friction discs 3 and 4, respectively, which are pressed by springs 5, 6 against a small friction disc 7. The friction disc 7 is turnably secured to a hollow shaft 8 which has at one end thereof an inner thread 8a. A spindle 10 passes through the hollow shaft 8 and has a threaded portion 9 which is in engagement with the thread 8a of the hollow shaft 8. At one end of the spindle 10 a further friction disc 11 is mounted for rotation therewith, while the other end of the spindle 10a is supported in a fixed bearing 10b which permits a pivoting of the spindle 10 in a plane perpendicular to the shafts 1, 2 between one position in which the friction disc 11 engages a disc 12 and another position in which it engages the disc 13. The discs 12 and 13 are secured to a shaft 14 which carries another friction disc 15. Shaft 14 is rotated by the disc 3 through the friction disc 15 so that the discs 12, 13 rotate in the same direction. Consequently the friction disc 11 and the spindle 10 will rotate in one direction when in engagement with the disc 12, and in opposite direction when in engagement with the disc 13.

The hollow shaft 8 is connected to an indicating hand 16 which is turnable about a pin 17, and cooperates with a dial 18. The indicating hand 16 has an extension 16' which carries a sliding contact, or moves a sliding contact, over a variable electric resistance 19.

The apparatus operates in the following manner:

When the rotary elements 1 and 2 rotate at the same speed the friction disc 7 is rotated by the discs 3 and 4 at a normal speed. The hollow shaft 8, the spindle 10, and the disc 11 remain in an intermediate position and the friction disc 11 does not engage the discs 12 and 13 so that the spindle 10 is at a standstill. In the event that one of the rotary elements 1, 2 rotates at a different speed, that is faster or slower than the other rotary element, the friction disc 7 will roll on one of the discs 3, 4, and its axis will move in a plane which is parallel to the planes of the discs 3, 4 so that the hollow shaft 8, and the spindle 10 will pivot about the bearing point 10a, 10b. Such pivoting movement will result in engagement of the friction disc 11 with one of the discs 12 or 13 so that the spindle 10 is rotated. Rotation of the threaded portion 9 will move the hollow shaft 8 in axial direction due to the movement of the inner thread 8a on the threaded portion 9. A shifting of the hollow shaft 8 in axial direction effects the shifting of the friction disc 7 from its normal position to a shifted position in which the transmission ratio of the variable transmission means 3, 4, 7 is changed since the effective radii of the discs 3 and 4 are changed. The shifting of rotary member 7 will be effected by the control means 8, 9, 10, 11, 12, 13 until member 7 reaches a position in which the speed of the surface portions of the discs 3, 4 which are in engagement with the friction disc 7 are equal, although the rotary elements 1, and 2 rotate at different speeds.

Since the indicating hand 16 is connected to the hollow shaft 8, the actual value of the speed ratio of the rotary elements 1 and 2 will be indicated on the dial 18. At the same time operating means, 16' and the electric resistance 19 actuate electrically operated means which in a known manner effect an adjustment of the conditions causing an increase or decrease of the speed of the rotary element whose speed has deviated from its normal value until the rotary elements 1 and 2 rotate again at the same speed. The friction disc 7 will then return to its former normal position in a sequence of operations which is the reversal of the sequence of operations described above.

Referring now to Figs. 3 and 4, in this embodiment the two rotary shafts 1 and 2 are connected to conical drums 21 and 22. The rotary element 1 is connected to the conical drum 21 through a differential gear means 30, while the conical drum 22 is directly driven by the rotary element 2. A friction disc 23 is in frictional engagement with the conical drums 21 and 22. An indicating hand 24 cooperating with a dial 24' is secured to a sleeve 25 which is movable together with the friction disc 23 on a threaded spindle 26. The spindle 26 carries a fixed gear 27, and can be manually adjusted by an operating member 28.

The gear 27 meshes with a gear 29 which is connected for rotation to the spider 30a of the differential gear means 30. A cam wheel 31 is also secured for rotation to the spider 30a and cooperates with a three-armed lever 32 which is held in its normal position shown in Fig. 4 by springs 32a, and can be pivoted about the pivot pin 32b into two actuated positions in which the mercury switch 34 is inclined in opposite directions. The mercury switch 34 has three terminals which are connected into a circuit 35 in which a reversing motor 36 is arranged. The direction of the motor 36 is reversed when the cams 31 pivots the lever 32 and thereby the mercury switch 34 from one inclined position into the other inclined position. In the intermediate normal position the motor is not actuated. The motor 36 operates adjusting means by which the conditions causing a variation of the rotary speed of one of the rotary elements 1, 2 is adjusted to normal, if one element has deviated from its normal speed.

During normal operation, that is when the rotary elements 1, 2 rotate at the same speed, the variable transmissions 21, 22, 23 transmit the rotation of the rotary element 2 to the differential gear means 30. In the event that the rotary elements 1 and 2 rotate at the same rotary speed, the spider 30a does not rotate, and the indicating hand 24 points on the dial 24' to the actual value of the rotary speed.

In the event, however that one of the rotary elements 1, 2 rotates at a speed different from the speed of the other rotary element, the bevel gears 30b rotate at different speeds, and the planetary wheels 30c turn the spider 30a so that the gear 29 turns the gear 27 and rotates the threaded spindle 26 whereby the threaded sleeve 25 is shifted in axial direction on the spindle 26.

The shifting of the sleeve 25 by the control means 30a, 29, 27, 26 also effects a shifting of the friction disc 23 whereby the ratio of transmission of the variable transmission means 21, 22, 23 is changed until the actual value of the speed ratio is obtained, and the bevel gears 30b rotate again at the same speed although the rotary elements 1, 2 rotate at different speeds. In this position equilibrium is again established and the indicating hand 24 indicates the actual speed ratio.

Simultaneously with the adjustment of the spindle 26, the operating means start the regulation. The cam wheel 31 is rotated by the spider so that a cam engages the cooperating arm of the lever 32 and shifts the same, and thereby the mercury switch 34 into a position in which the motor 36 is started to rotate in such direction as to adjust the means which effected a change of the speed of one of the rotary elements 1, 2 until the respective element obtains again its desired normal speed. Thereupon the sequence of operations described above is carried out in reverse order until the normal desired conditions are obtained.

Figure 6:
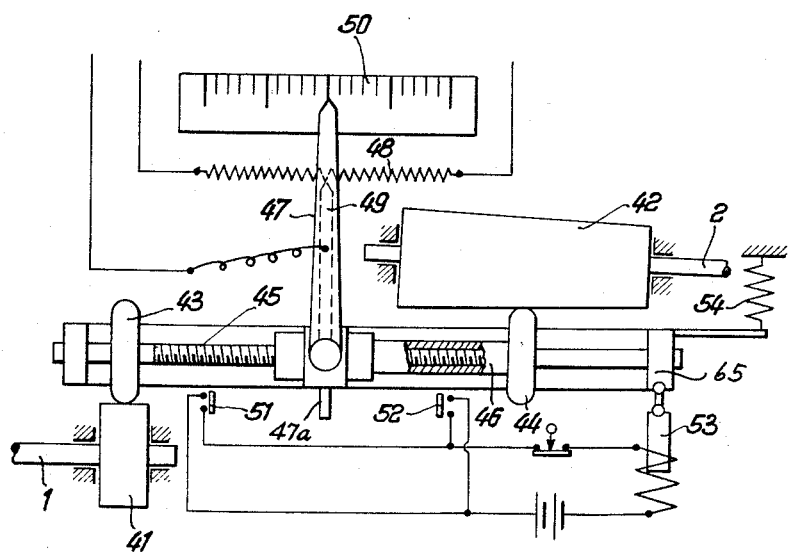
Fig. 6 is a plan view of the embodiment shown in Fig. 5.

Referring now to Figs. 5 and 6, and more particularly to Fig. 6, the drive shaft 1 drives the drum 41, and the comparison shaft 2 drives a conical drum 42. A friction disc 43 is driven by the drum 41, and a friction disc 44 is driven by the conical drum 42. The friction disc 43 is secured for rotation to a threaded spindle 45 which engages an inner thread in the hollow shaft 46 carrying the friction disc 44. An indicating pointed 47 is secured to the hollow shaft 46 and cooperates with a dial 50. As best seen in Fig. 5, the hollow shaft 46 also carries an arm 49 which constitutes a slide contact moving over the electric resistance 48 which is connected into a circuit. The indicating pointer 47 has an extension 47a which cooperates with two contacts 51 and 52, closing the same when arriving in its end positions. Closing of one of the contacts 51, 52 effects energizing of an electro-magnet means 53 which is connected to the pivotally mounted support 65 that carries the spindle 45. A spring 54 tends to pivot the support 65 into a position in which the friction discs 43, 44 engage the drums 41, 42, respectively. When, however, the indicating means 47, 47a engage one of the stops 51, 52, the circuit of the electro-magnet means is closed, and the electro-magnet pivots the support 65 in opposite direction against the action of the spring 54 until the friction discs 43, 44 are disengaged from the drums 41, 42.

When the rotary elements 1 and 2 rotate at the same speed, the friction discs 43, 44 rotate at the same speed and the same direction together with the spindle 45 and the hollow shaft 46 so that the hollow shaft 46 does not move in axial direction. When one of the rotary elements 1 or 2 rotates at a different speed, the friction discs 43, 44 also rotate at different speeds and the hollow shaft is screwed along the spindle 45 to move in axial direction whereby the friction disc 44 is moved along the conical drum 42 so as to be rotated at a different speed for changing the transmission ratio. When the speeds of the friction discs 43, 44 are again equal, the hollow shaft stops and the indicating means indicate the extent of adjustment and the actual value of the speed ratio. At the same time the contact arm 49, moving on the variable resistance 48, may cause an indication at a remote station, or actuate adjusting means for adjusting the conditions causing a varied speed of one of the rotary elements 1, 2.

The embodiment shown in Figs. 7 and 8 corresponds substantially to the embodiment shown in Figs. 5 and 6. The support 65 is pivoted at 65a and carries a hollow spindle 45 whose thread 145 engages an inner thread 146 of the hollow shaft 46. A supporting shaft 245 passes through axial bores in spindle 45 and in shaft 46 and is mounted in bearings 345 on support 65. The spindle 45 carries the friction disc 43 which frictionally engages a disc 61 carried by the rotary element 1. The hollow shaft 46 carries the friction disc 44 which frictionally engages a disc 62 carried by the rotary element 2. A spring 54 tends to pivot the support 65 into a position in which the discs 43, 44 frictionally engage the discs 61, 62. When the rotary elements 1, 2 rotate at different speeds, the friction discs 43, 44 rotate at different speed whereby the movable hollow shaft 46 is screwed onto the spindle 45 and the effective radius of the disc 62 is adjusted for changing the transmission ratio until the discs 43 and 44 rotate at the same rotary speed. The axial movement of the hollow shaft 46 is again limited by stop contacts 51, 52 which, when actuated by projection 246 on shaft 46, close the circuits of electro-magnet means 53 which pivot the support against the action of the spring 54 into a position in which the friction discs 53, 54 are disengaged from the discs 61, 62. The operating means include a rack bar 63 secured to the hollow shaft 46 and meshing with a pinion 64 that is connected for rotation to the indicating means 47 and to the contact arm 49. The operating means operate in the same manner as the corresponding elements described with respect to Fig. 6.

It will be understood that each of the elements described above, or two or more together, may also find a useful application in other types of speed comparing devices differing from the types described above.

While the invention has been illustrated and described as embodied in an apparatus for indicating and regulating speed differences between two rotary elements rotating a variable speeds, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An apparatus for comparing speeds of a textile whose length is being changed, comprising, in combination, two rotary parallel shafts adapted to be rotated by the textile, at least one of said shafts rotating at a varying speed; a first conical friction drum secured to one of said shafts; a second conical friction drum having an axis parallel to the axis of said first friction drum; a friction disc engaging said friction drums; a sleeve having an inner thread and rotatably supporting said friction disc; a rotatable spindle having a thread engaging said inner thread of said sleeve for moving said friction disc in axial direction with respect to said drums; a differential gear means including a first sun gear connected to said second friction drum, a second sun gear connected to the other of said shafts, a spider, planet gears supported by said spider and meshing with said sun gears; gear means connecting said spider with said spindle for rotating the same when said sun gears rotate at different speeds due to a speed difference between said two parallel shafts whereby said friction disc is axially shifted for varying the transmission ratio between said friction drum and said friction disc until said sun gears rotate at a desired speed ratio; and indicating means connected to said sleeve.

2. An apparatus as claimed in claim 1 and including a cam means secured to said spider for rotation therewith; switch means operated by said cam means; a reversible motor actuated by said switch means to rotate in opposite directions for adjusting the conditions causing a change in the length of the textile and thereby in the speed of said one of said rotary shafts.

3. An apparatus as claimed in claim 2 wherein said switch means includes a mercury switch pivotally mounted for movement between two positions.

4. In an apparatus for comparing speeds of a textile whose length is being changed, in combination, two rotary elements adapted to be rotated by the textile, at least one of said rotary elements rotating at a varying speed; variable transmission means connected for rotation to said one of said rotary elements and including a rotary friction member secured for rotation to said one rotary element, and a rotary friction disc cooperating with said friction member; a hollow shaft supporting said friction disc, said hollow shaft having an inner thread; a turnable threaded spindle passing through and supporting said hollow shaft; means connecting said spindle to the other rotary element for rotation therewith so that different speeds of said rotary elements result in an axial movement of said hollow shaft on said threaded spindle and in axial movement of said rotary friction disc for changing the ratio of transmission of said variable transmission means; indicating means connected to said hollow shaft for indicating the extent of adjustment of said variable transmission means and thereby the actual ratio of the speeds of said rotary elements; stop contact means cooperating with said indicating means for limiting the extent of movement of said hollow shaft; a movable support supporting said spindle and said hollow shaft and being movable between an operative position in which said friction disc engages said friction member and an inoperative position in which said friction disc is spaced from said friction member; spring means urging said support into said operative position; electro-magnet means connected to said support for moving the same into said inoperative position; and an electric circuit connecting said contact means with said electro-magnet means.

5. An apparatus for comparing speeds comprising, in combination, two rotary shafts, at least one of said shafts rotating at a varying speed; a first friction means secured to one of said shafts; a second friction means; a friction disc engaging said first and second friction means and rotating with the same; a first threaded member having an inner thread and a second threaded member having an outer thread engaging said inner thread, one of said threaded members supporting said friction disc for rotation and non-movable in axial direction thereon so that turning of said other threaded member moves said friction disc relative to said first and second friction means; differential transmission means including a first sun member connected to said second friction means for rotation therewith, a second sun member connected to the other of said shafts, a spider, and planet members supported by said spider and engaging said sun members; and means connecting said spider with said other threaded member for rotating the same when said sun members rotate at different speeds due to a speed difference between said two shafts whereby said friction disc is shifted for varying the transmission ratio between said friction means and said friction disc until said sun members rotate at a desired speed ratio; and regulating means for controlling the speed of one of said shafts and being connected to and controlled by said one threaded member.

6. An apparatus as set forth in claim 5 wherein said shafts are parallel and wherein each of said first and second friction means is a conical drum, said conical drums having parallel axes.

References Cited in the file of this patent

UNITED STATES PATENTS

| | | |
|---|---|---|
| 789,446 | Parcelle | May 9, 1905 |
| 887,616 | Field | May 12, 1908 |
| 1,052,321 | Craven | Feb. 4, 1913 |
| 1,497,874 | Prouty et al. | June 17, 1924 |
| 2,158,137 | McConnell | May 16, 1939 |
| 2,399,685 | McCoy | May 7, 1946 |
| 2,476,269 | Blackman | July 19, 1949 |
| 2,494,092 | Hayward | Jan. 10, 1950 |
| 2,720,361 | Halley | Oct. 11, 1955 |

FOREIGN PATENTS

| | | |
|---|---|---|
| 146,923 | Germany | Dec. 30, 1903 |